(12) United States Patent
Ranganathan

(10) Patent No.: US 8,847,983 B1
(45) Date of Patent: Sep. 30, 2014

(54) MERGE TOOL FOR GENERATING COMPUTER GRAPHICS

(75) Inventor: Sreedhar Ranganathan, Tamil Nadu (IN)

(73) Assignee: Adobe Systems Incorporated, San Jose, CA (US)

(*) Notice: Subject to any disclaimer, the term of this patent is extended or adjusted under 35 U.S.C. 154(b) by 590 days.

(21) Appl. No.: 12/322,588

(22) Filed: Feb. 3, 2009

(51) Int. Cl.
*G09G 5/00* (2006.01)
(52) U.S. Cl.
USPC .......................................... 345/629; 345/594
(58) Field of Classification Search
CPC ............................ G06F 3/0481; G06F 3/04883
USPC ................................................. 345/629, 594
See application file for complete search history.

(56) References Cited

U.S. PATENT DOCUMENTS

| | | | |
|---|---|---|---|
| 5,982,383 A | 11/1999 | Kumar et al. | |
| 6,014,146 A | 1/2000 | Freeman | |
| 6,459,442 B1 | 10/2002 | Edwards et al. | |
| 6,624,832 B1* | 9/2003 | Thomas | 715/863 |
| 7,502,028 B1 | 3/2009 | Asente et al. | |
| 2008/0005664 A1* | 1/2008 | Chandra | 715/513 |

OTHER PUBLICATIONS

Mordy Golding, "Real World Adobe® Illustrator® CS2," Nov. 10, 2005, Peachpit Press, pp. 61, 127, 134-135.*
Rick Brewster et al. ; "Paint.net: Selection Tools"; Mar. 22, 2006; http://eecs.wsu.edu/paint.net/doc/2.6/Help/en/SelectionTools.html; pp. 1-2.*
Todd Perkins, "Adobe—Flash CS4 Tutorial: Getting Started: Object and Merge Drawing", Learn Flash Professional CS4, Oct. 15, 2008, http://www.adobe.com/designcenter/flash/articles/lrvid4249_fl.html.
James Gonzalez, "Adobe Flash CS3, Object vs. Merge Drawing Models", Adobe Flash CS3 Tutorials, Oct. 12, 2007, http://www.vtc.com/products/AdobeFlashCS3/CreatingSimpleGraphics/66348.

* cited by examiner

*Primary Examiner* — Kee M Tung
*Assistant Examiner* — Peter Hoang
(74) *Attorney, Agent, or Firm* — Kilpatrick Townsend & Stockton LLC

(57) ABSTRACT

A technique for editing is disclosed. In one embodiment, the technique includes generating a first merged shape based on a user selecting an intersection of paths in a drawing using a merge shape tool of a graphical user interface of a computer graphics program executing on a computer, wherein the intersection includes a first shape unit, and rendering the first merged shape.

26 Claims, 15 Drawing Sheets

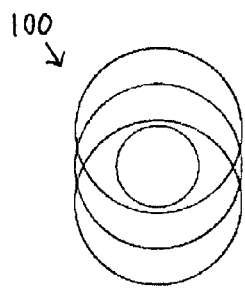
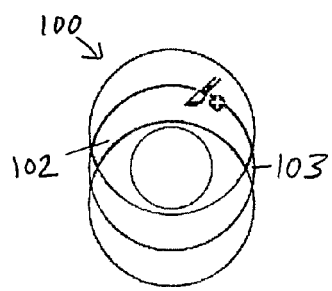
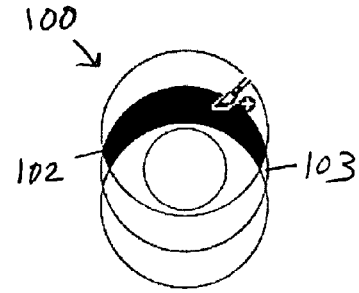
FIG. 1A          FIG. 1B          FIG. 1C
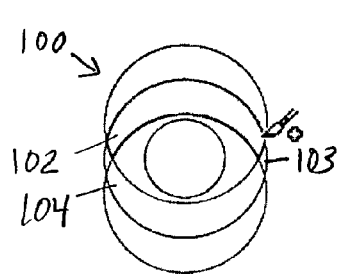
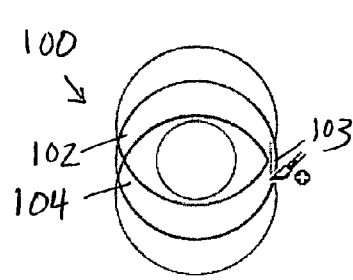
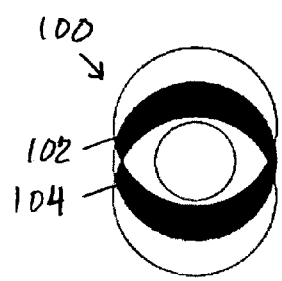
FIG. 1D          FIG. 1E          FIG. 1F
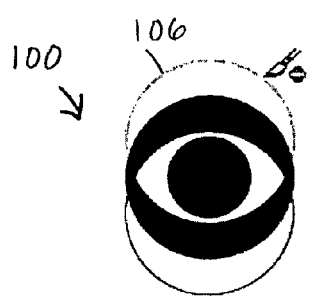
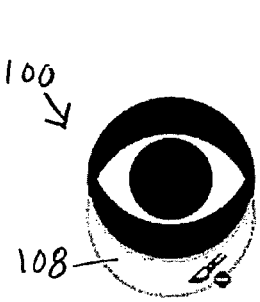
FIG. 1G          FIG. 1H          FIG. 1I
FIG. 1

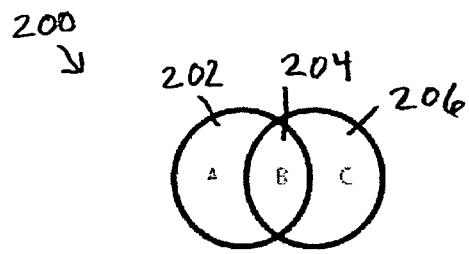
FIG. 2A
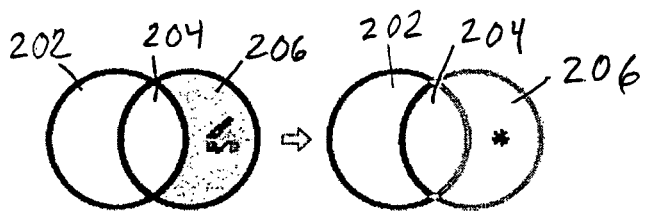
FIG. 2B
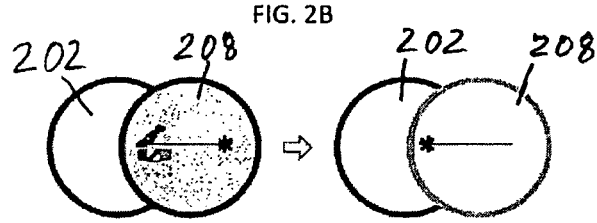
FIG. 2C
FIG. 2

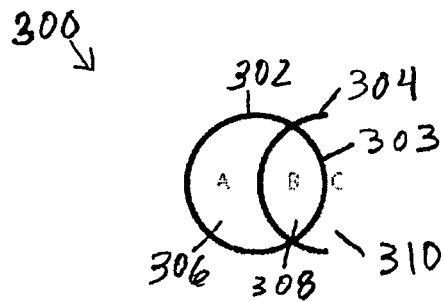
Fig. 3A
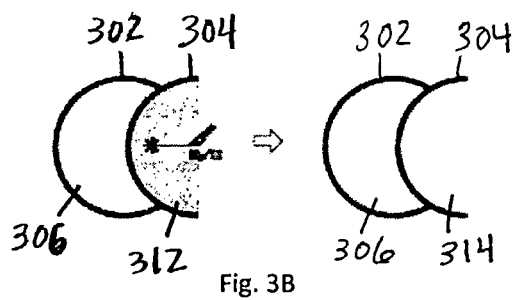
Fig. 3B
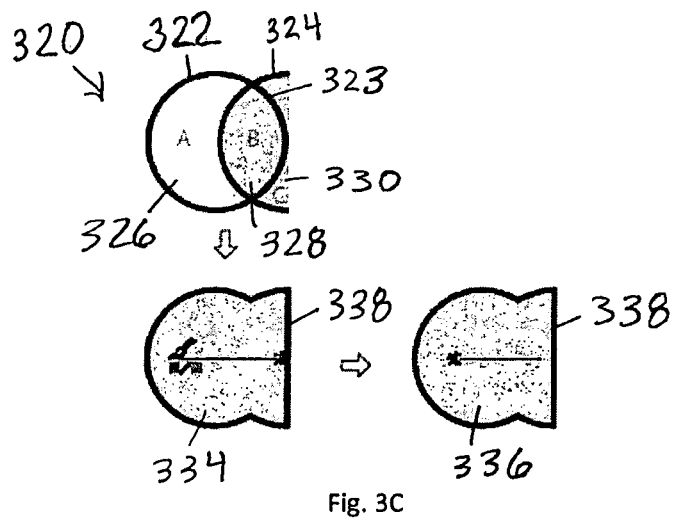
Fig. 3C
FIG. 3

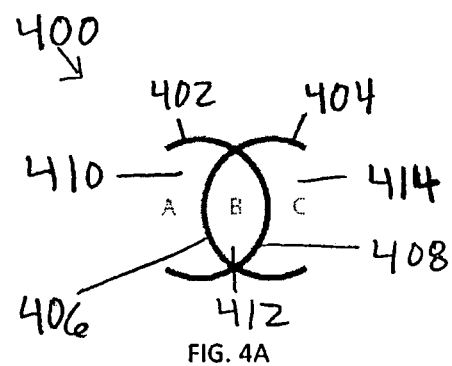
FIG. 4A
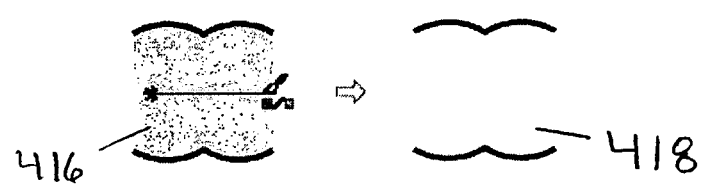
FIG. 4B
FIG. 4

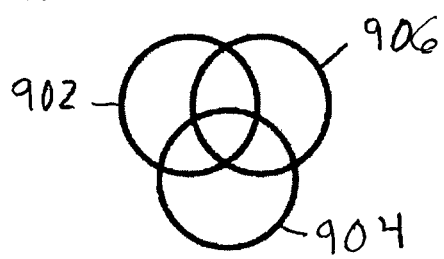
FIG. 9A
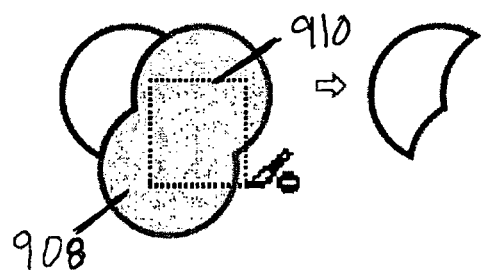
FIG. 9B        FIG. 9C
FIG. 9

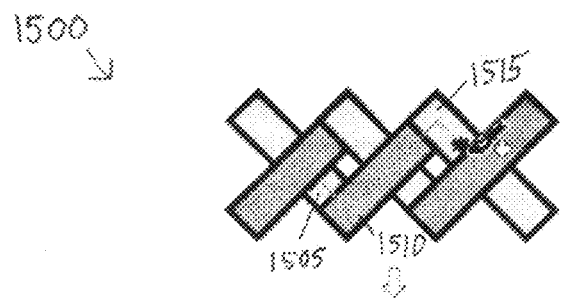
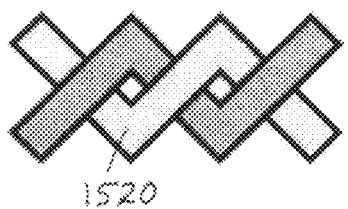
FIG. 15A
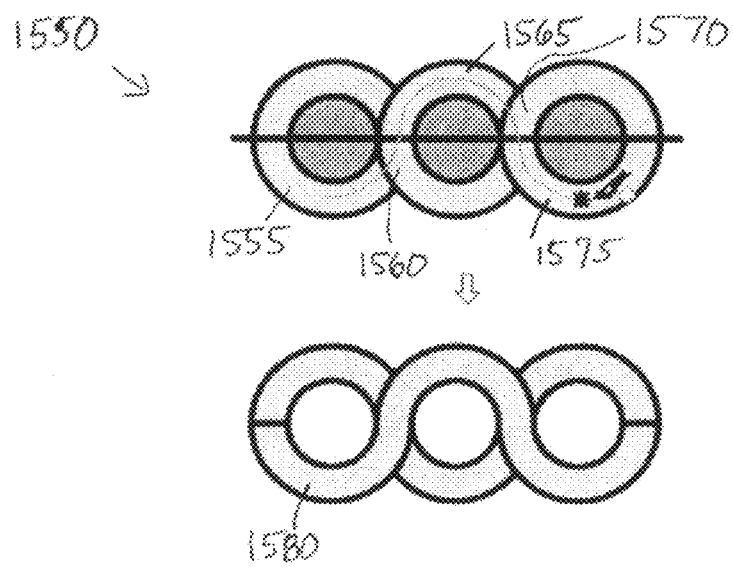
FIG. 15B
FIG. 15

US 8,847,983 B1

MERGE TOOL FOR GENERATING COMPUTER GRAPHICS

BACKGROUND OF THE INVENTION

Drawings are used to express ideas visually on the web, in print or in other media. Drawings can be created and edited on a computer using various drawing applications. A typical drawing includes a plurality of paths that form regions or shapes, each of which could be filled with a color. The problem is drawing applications typically make it difficult to create/generate shapes formed by intersecting paths and/or other shapes. An improved user interface for creating and editing computer generated graphics is needed.

BRIEF DESCRIPTION OF THE DRAWINGS

Various embodiments of the invention are disclosed in the following detailed description and the accompanying drawings.

FIG. 1 is a series of drawings illustrating a sequence of edits of a merge shape tool of a computer graphics software application executing on a computer in accordance with one embodiment.

FIG. 2 is a series of drawings illustrating a sequence of edits involving closed paths using a merge shape tool of a computer graphics software application executing on a computer in accordance with one embodiment.

FIG. 3 is a series of drawings illustrating a sequence of edits involving closed and open paths using a merge shape tool of a computer graphics software application executing on a computer in accordance with one embodiment.

FIG. 4 is a series of drawings illustrating a sequence of edits involving open paths using a merge shape tool of a computer graphics software application executing on a computer in accordance with one embodiment.

FIG. 9 is a series of drawings illustrating a sequence of edits involving closed paths using an erase mode of a merge shape tool of a computer graphics software application executing on a computer in accordance with one embodiment.

FIG. 15 is a series of drawings illustrating a sequence of edits involving irregular/freeform shape regions using a merge shape tool of a computer graphics software application executing on a computer in accordance with one embodiment.

DETAILED DESCRIPTION

Figure 5A:
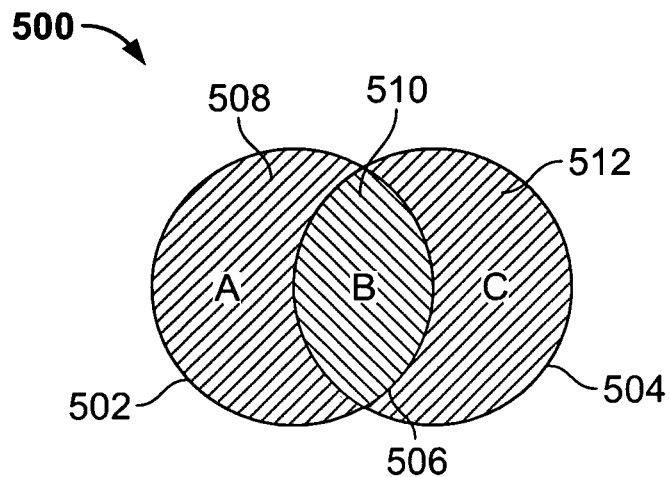
FIG. 5 is a series of drawings illustrating a sequence of edits involving closed paths and color fills using a merge shape tool of a computer graphics software application executing on a computer in accordance with one embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For example, designers and/or computer graphics users often desire to create shapes of computer graphics by merging one or more shapes (e.g., by combining and/or splitting or intersecting primitive shapes or primitives to create more complex shapes desired, by the user). Users also often create construction lines and then desire to create shapes based on one or more intersecting regions of such construction lines with one or more shapes (e.g., regions).

Accordingly, what is needed is an improved method and system for allowing a user to generate new shapes of computer graphics by merging one or more shapes.

In one embodiment, an improved user interface for creating computer generated graphics (also referred to herein as computer graphics) is provided. In one embodiment, a user interface for generating various shapes of computer graphics defined by vector paths to improve productivity in creating graphical design output files is provided. In one embodiment, a method and system for allowing a user to generate shapes of computer graphics by merging one or more shapes allows a user to intuitively and easily merge one or more shapes and/or construction lines using a merge operation and also to intuitively and easily erase shapes and/or construction lines associated using an erase operation, thereby allowing users to more efficiently and effectively create desired shapes of computer graphics using a single, easy to use and intuitive user interface of a computer graphics software tool.

In one embodiment, a merge operation acts on an open path to allow the user to create shapes formed by an intersection of paths. For example, in one embodiment, a merge shape tool allows users to perform the following operations: (1) extract a new shape from interlocking areas formed by paths; and (2) merge one or more shapes to generate new shapes.

In one embodiment, a new computer graphics user interface tool provides at least two tools. The first tool (also referred to herein as a merge shape tool) merges one or more parts (e.g., interlocking regions) of user selected shapes (e.g., primitives). The second tool (also referred to herein as an erase shape tool) deletes (e.g., erases) user selected shapes and/or construction lines (e.g., an eraser tool that acts on the selected shape and/or path). For example, the user can toggle between these two user interface tools by pressing an 'option' or 'ALT' keyboard button (e.g., 'option' keyboard button on a Mac and 'ALT' keyboard button on a PC). In one embodiment, a closed region (e.g., interlocking region) or closed shape formed by intersecting paths forms the lowest unit of a shape (referred to herein as shape unit), and one or more closed shape units can be merged using the merge shape tool to generate a new shape. As will be apparent to one of ordinary skill in the art while the various merge tool embodiments described below are shown with respect two dimensional computer graphics, these merge tool embodiments can similarly be applied to three dimensional computer graphics.

FIG. 1 is a series of drawings illustrating a sequence of edits using a merge shape tool of a computer graphics software application executing on a computer in accordance with one embodiment. Referring to FIG. 1A, a drawing 100 is selected to edit (e.g., by a user of the computer graphics software application), and a merge shape tool is also selected to edit drawing 100. Referring to FIG. 1B, an intersection of interest 102 is highlighted, which as shown is a closed shape that is a shape unit, using a mouse over operation. In one embodiment, a mouse over operation is performed by placement of a mouse cursor in intersection of interest 102 of drawing 100 and clicking the computer mouse button. Referring to FIG. 1C, upon the clicking and then releasing of the computer mouse button (e.g., a click and release operation using the computer mouse), the selected closed shape 102 is highlighted with a default fill color (or, in one embodiment, a last used color or, in one embodiment, a newly selected color).

Referring to FIG. 1D, a click-drag operation is initiated across multiple shape units. In one embodiment, a click-drag operation is performed by placement of the mouse cursor in intersection of interest 102 of drawing 100, clicking the computer mouse button, and dragging the mouse cursor through intersection of interest 102 (the click-drag operation continues as shown with reference to FIG. 1E). Referring now to FIG. 1E, as the mouse cursor is dragged across multiple shape units 102, 103 and 104 of drawing 100, the merged shape including the selected shape units is displayed as a highlighted merged shape. As shown in FIG. 1F, upon release of the computer mouse button, the merged shape is generated and rendered based on the shape intersections (e.g., shape units, as shown in FIGS. 1E and 1F, shape units 102, 103 and 104 are selected to generate the new merged shape) selected using an edit action, such as a single edit action (e.g., a mouse over operation, a click-drag operation, and/or similar user inputs using a computer mouse, keyboard and/or any other input device that are based on a single and/or continuous input sequence using an input device).

Referring now to FIG. 1G, an erase shape mode of the merge shape tool is selected (e.g., toggled to by the user), and as shown, a construction line (or path) 106 to erase is selected. Upon placement of the mouse cursor over selected line 106 of drawing 100, the selected line is highlighted and upon the computer mouse button being released, the selected line is erased (as shown in FIG. 1H). In one embodiment, selected line 106 is highlighted upon placement of the mouse cursor over the selected line and clicking the computer mouse button, and the selected line is then erased upon the computer mouse button being released. In one embodiment, an option (or toggle) key or button allows for toggling the merge shape tool to an erase mode. As shown in FIG. 1H, a closed region or shape 108 is selected and erased. Specifically, as shown, shapes to be deleted are highlighted (e.g., displayed in a different color), which provides a preview of the resulting shape before executing the erase operation. In one embodiment; a merged shape is erased using the erase shape mode of the merge shape tool by placing the mouse cursor in the selected shape (e.g., intersection or closed region), clicking the computer mouse button (at which point the selected shape to be erased is highlighted), and then releasing the computer mouse button to generate the desired resulting shape with the selected shape erased (as shown in FIG. 1I). As shown in FIG. 1I, the final shape 110 is rendered thereby displaying the desired computer graphics output.

FIG. 2 is a series of drawings illustrating a sequence of edits involving closed paths using a merge shape tool of a computer graphics software application executing on a computer in accordance with one embodiment. As shown in FIG. 2A, a drawing 200 includes two closed shapes (e.g., intersecting circles), which includes three shape units 202, 204, and 206. Referring to FIG. 2B, a drawing 200 is selected to edit, and a merge shape tool is also selected to edit drawing 200. Upon a mouse over operation in shape unit 206, shape unit 206 is then highlighted as shown. Referring now to FIG. 2C, upon a click-drag operation using the merge shape tool across shape units 206 and 204, the merged shape that will be generated is displayed as shown as merged shape 208. Upon release of the computer mouse button, the generated merged shape 208 is rendered.

FIG. 3 is a series of drawings illustrating a sequence of edits involving closed and open paths using a merge shape tool of a computer graphics software application executing on a computer in accordance with one embodiment. As shown in FIG. 3A, a drawing 300 includes a closed path 302 (e.g., a circle, which includes a path 303 within the intersection with open path 304) intersected by an open path 304 (e.g., a half circle), which as shown includes two shape units 306 and 308, and an open region 310. A drawing 300 is selected to edit, and a merge shape tool is also selected to edit drawing 300. Upon a click-drag operation in shape unit 308 and open region 310, a new merged shape 312 is highlighted as shown in FIG. 3B. Referring to FIG. 3B, upon release of the computer mouse button (and thereby completing the click-drag operation), the generated merged shape 314 is rendered (and as a result, path 303 from drawing 300 is erased).

Referring now to FIG. 3C, a drawing 320 includes a closed path 322 (e.g., a circle, which includes a path 323 within the intersection with open path 324) intersected by an open path 324 (e.g., a half circle), which as shown includes two shape units 326 and 328, and an open region 330. FIG. 3C is similar to FIG. 3A except that in FIG. 3C closed region 328 and open region 330 are filled with a color fill. A drawing 320 is selected to edit, and a merge shape tool is also selected to edit drawing 320. Upon a click-drag operation starting in open region 330, through shape unit 328 and through shape unit 326, a new merged shape 334 is then highlighted as shown. Upon release of the computer mouse button (and thereby completing the click-drag operation), the generated merged shape with color fill 336 is rendered (and as a result, path 303 of drawing 320 is erased, and a new path 338 is added). In one embodiment, the new merged shape 336 is automatically filled with the color of shape unit 328 and open region 330. In one embodiment, the new merged shape 336 is automatically filled with a default fill color (or, in one embodiment, a last used color or, in one embodiment, a newly selected color).

FIG. 4 is a series of drawings illustrating a sequence of edits involving open paths using a merge shape tool of a computer graphics software application executing on a computer in accordance with one embodiment. As shown in FIG. 4A, a drawing 400 includes an open path 402 (e.g., a partial circle, which includes a path 408 within the intersection with open path 404) intersected by an open path 404 (e.g., a partial circle, which includes a path 406 within the intersection with open path 402), which as shown includes two open regions 410 and 414, and a closed region 412. A drawing 400 is selected to edit, and a merge shape tool is also selected to edit drawing 400. Upon a click-drag operation initiated in open region 410 and continued through closed region 412 and open region 414, a new merged shape 416 is highlighted as shown in FIG. 4B. Referring to FIG. 4B, upon release of the computer mouse button (and thereby completing the click-drag operation), the generated merged shape 418 is rendered (and as a result, paths 406 and 408 from drawing 400 are erased).

Figure 5B:
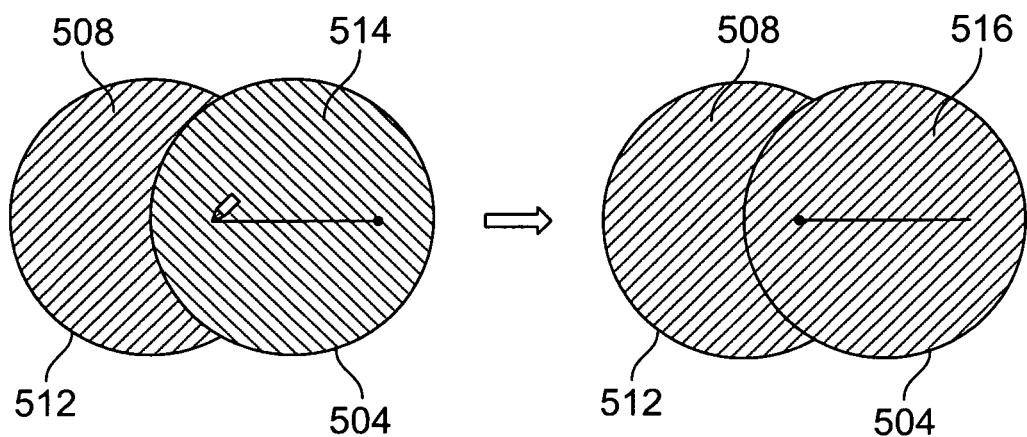

FIG. 5 is a series of drawings illustrating a sequence of edits involving closed paths and color fills using a merge shape tool of a computer graphics software application executing on a computer in accordance with one embodiment. As shown in FIG. 5A, a drawing 500 includes a closed path 502 (e.g., a circle, which includes a path 506 within the intersection with closed path 504) intersected by a closed path 504 (e.g., a circle or any other regular shape region), which as shown includes three closed regions (e.g., shape units) 508, 510, and 512, which are each color filled closed regions. A drawing 500 is selected to edit, and a merge shape tool is also selected to edit drawing 500. Upon a click-drag operation initiated in closed region 512 and continued through closed region 510, a new color filled merged shape 514 is highlighted as shown in FIG. 5B. Referring to FIG. 5B, upon release of the computer mouse button (and thereby completing the click-drag operation), the generated merged shape with color fill 516 is rendered (and as a result, path 506 from drawing 500 is erased). As shown, the new merged shape 516 is automatically filled with the color of shape unit 512. In another embodiment, the color fill of the shape unit that is the last selected shape unit (e.g., on which a click-drag operation is completed by the user) determines the color fill of the resultant, new merged shape after completion of the operation using the merge tool (e.g., if this alternative color fill approach were applied to FIG. 5, then the resultant, new merged shape 516 would automatically be filled with the color of closed region 510 instead of 512).

Figure 6:
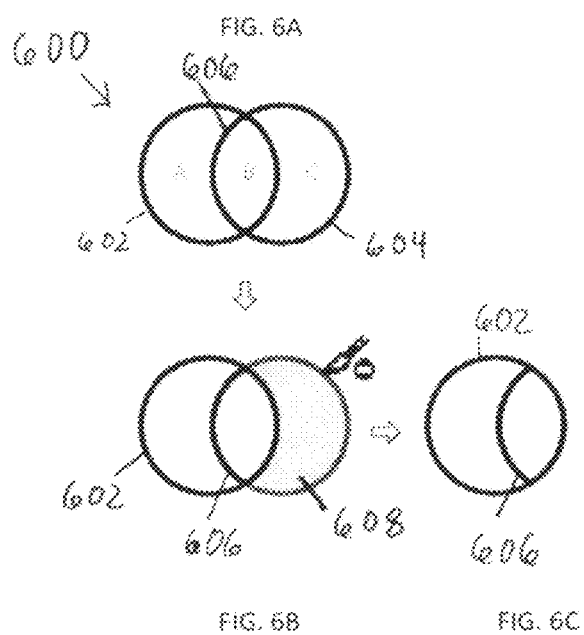
FIG. 6 is a series of drawings illustrating a sequence of edits involving closed paths using an erase mode of a merge shape tool of a computer graphics software application executing on a computer in accordance with one embodiment.

FIG. 6 is a series of drawings illustrating a sequence of edits involving closed paths using an erase mode of a merge shape tool of a computer graphics software application executing on a computer in accordance with one embodiment. As shown in FIG. 6A, a drawing 600 includes two closed shapes (e.g., intersecting circles) 602 and 604. Also as shown, closed shape 604 includes a path 606, which is the interior path resulting from the intersection of closed shape 604 by closed shape 602. Referring to FIG. 6B, a drawing 600 is selected to edit, and an erase mode of a merge shape tool is also selected to edit drawing 600. In one embodiment, the merge shape tool is selected from a toolbar of the computer graphics software application, and then the merge shape tool is toggled to an erase mode (e.g., using an 'option' or ALT key or some other predetermined hot key(s)/button(s) to shift to the erase mode of the tool). Upon selection of path 604, the selected path is then highlighted as shown in FIG. 6B as highlighted path 608 (e.g., as shown, on mouse over of path 604, both path 604 and its enclosed shape unit 608 are highlighted). Referring now to FIG. 6C, upon request of the desired erase operation using the erase mode of the merge shape tool, the resulting shape that will be generated is rendered as shown in FIG. 6C, in which closed path 602 now just includes intersecting path 606 (as path 604 of drawing 600 has been erased). In one embodiment, the erase operation is performed by a click and release operation using the computer mouse, in which the path and/or shape to be erased is selected and highlighted upon the mouse cursor being placed on/in the path/shape to be erased and then the erase operation is performed upon the release of the computer mouse button. In one embodiment, a first stylus for the merge shape tool is mapped to a drawing edge of the graphical user interface of the computer graphics software application (e.g., computer graphics program), and a second stylus for an erase shape tool is mapped to an erasing edge of the graphical user interface of the computer graphics software application. In one embodiment, the first stylus and the second stylus are implemented as a single stylus, in which the merge shape tool is associated with one end of the stylus (e.g., a drawing tip of the stylus) mapped to the drawing edge of the graphical user interface of the computer graphics software application, and the erase shape tool is associated with the opposite end of the stylus (e.g., an erase tip of the stylus) mapped to the erasing edge of the graphical user interface of the computer graphics software application.

Figure 7A:
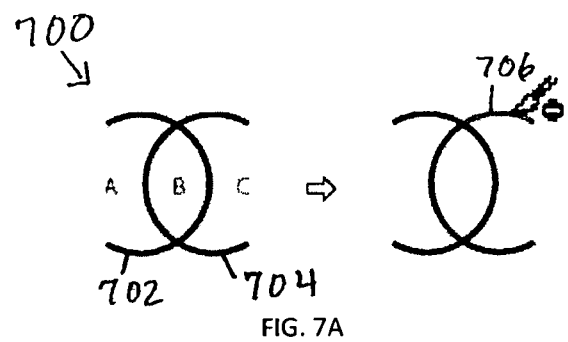
FIG. 7 is a series of drawings illustrating a sequence of edits involving open paths using an erase mode of a merge shape tool of a computer graphics software application executing on a computer in accordance with one embodiment.
Figure 7B:
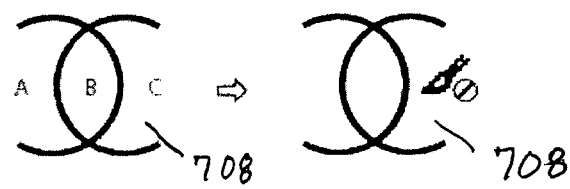

FIG. 7 is a series of drawings illustrating a sequence of edits involving open paths using an erase mode of a merge shape tool of a computer graphics software application executing on a computer in accordance with one embodiment. As shown in FIG. 7A, a drawing 700 includes an open path 702 intersected by an open path 704. A drawing 700 is selected to edit, and a merge shape tool is also selected to edit drawing 700 and toggles the tool to an erase mode (as similarly discussed above with respect to FIG. 6). Upon a selection of path 706 for an erase operation, the selected path is highlighted for the erase operation as shown. But if an attempt is made to select the non-filled (no color fill in the open shape) 708 by performing a mouse over operation using the computer mouse in open shape 708, then no erase mode operation is performed (and no path/shape is highlighted for a selected erase operation, as open shape 708 includes no erasable color and/or path) as shown in FIG. 7B.

Figure 7C:
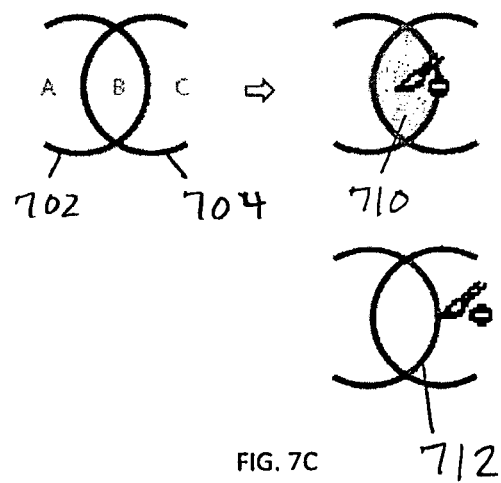

Referring now to FIG. 7C, as similarly shown in FIG. 7A, drawing 700 includes an open path 702 intersected by an open path 704. A drawing 700 is selected to edit, and a merge shape tool is also selected to edit drawing 700 and toggles the tool to an erase mode (as similarly discussed above with respect to FIG. 6). Upon a selection of closed shape (e.g., shape unit) 710 for an erase operation, the selected closed shape is highlighted for the erase operation as shown. Similarly, upon a selection of path 712 for an erase operation, the selected path is highlighted for the erase operation as shown.

Figure 8:
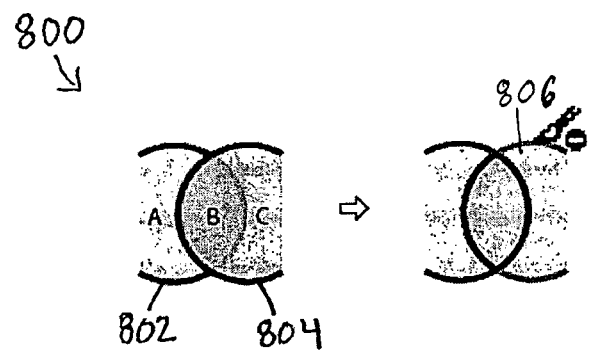
FIG. 8 is a series of drawings illustrating a sequence of edits involving open paths with color fills using an erase mode of a merge shape tool of a computer graphics software application executing on a computer in accordance with one embodiment.

FIG. 8 is a series of drawings illustrating a sequence of edits involving open paths with color fills using an erase mode of a merge shape tool of a computer graphics software application executing on a computer in accordance with one embodiment. As shown in FIG. 8, a drawing 800 includes an open path 802 intersected by an open path 804. A drawing 800 is selected to edit, and a merge shape tool is also selected to edit drawing 800 and toggles the tool to an erase mode (as similarly discussed above with respect to FIG. 6). In contrast to FIG. 7B, when the user selects the color filled open shape 806 by performing a mouse over operation over color filled open shape 806 using the computer mouse, then color filled open shape 806 is highlighted for the erase operation.

FIG. 9 is a series of drawings illustrating a sequence of edits involving closed paths using an erase mode of a merge shape tool of a computer graphics software application executing on a computer in accordance with one embodiment. As shown in FIG. 9A, a drawing 900 includes intersecting closed paths 902, 904, and 906. A drawing 900 is selected to edit, and a merge shape tool is selected to edit drawing 900 and toggles the tool to an erase mode (as similarly discussed above with respect to FIG. 6). Referring to FIG. 9B, a click-drag operation is performed using a computer mouse to define a path 910 to select a shape for an erase operation, which is highlighted as shown as open shape 908 (e.g., highlighted during the click-drag operation, and before release of the mouse button to complete the click-drag operation). Referring to FIG. 9C, upon request of the desired erase operation using the erase mode of the merge shape tool (e.g., by releasing the mouse button thereby completing the click-drag operation), the resulting shape that will be generated is rendered as shown in FIG. 9C (in which open shape 908 has been erased).

Figure 10:
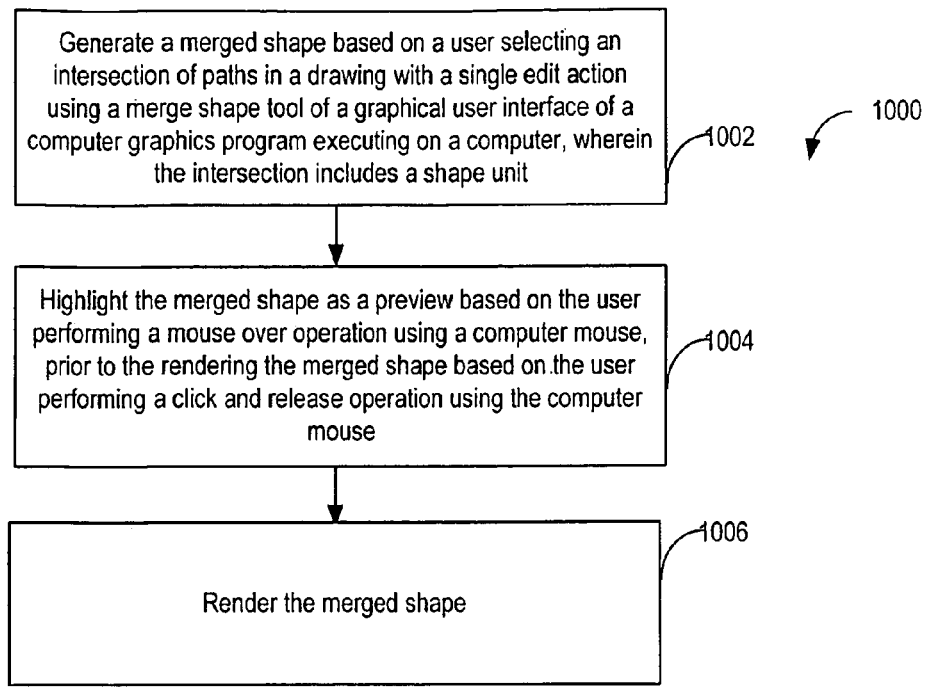
FIG. 10 is a flow diagram for a sequence of edits using a merge shape tool of a computer graphics software application executing on a computer in accordance to generate a merged shape with one embodiment.

FIG. 10 is a flow diagram 1000 for a sequence of edits using a merge shape tool of a computer graphics software application executing on a computer to generate a merged shape in accordance with one embodiment. At stage 1002, generate a merged shape based on a selection of an intersection of paths in a drawing with a single edit action using a merge shape tool of a graphical user interface of a computer graphics program executing on a computer, wherein the intersection includes a shape unit. At stage 1004, highlight the merged shape as a preview based on a mouse over operation using a computer mouse, prior to the rendering the merged shape based on a click and release operation using the computer mouse. At stage 1006, render the merged shape.

Figure 11:
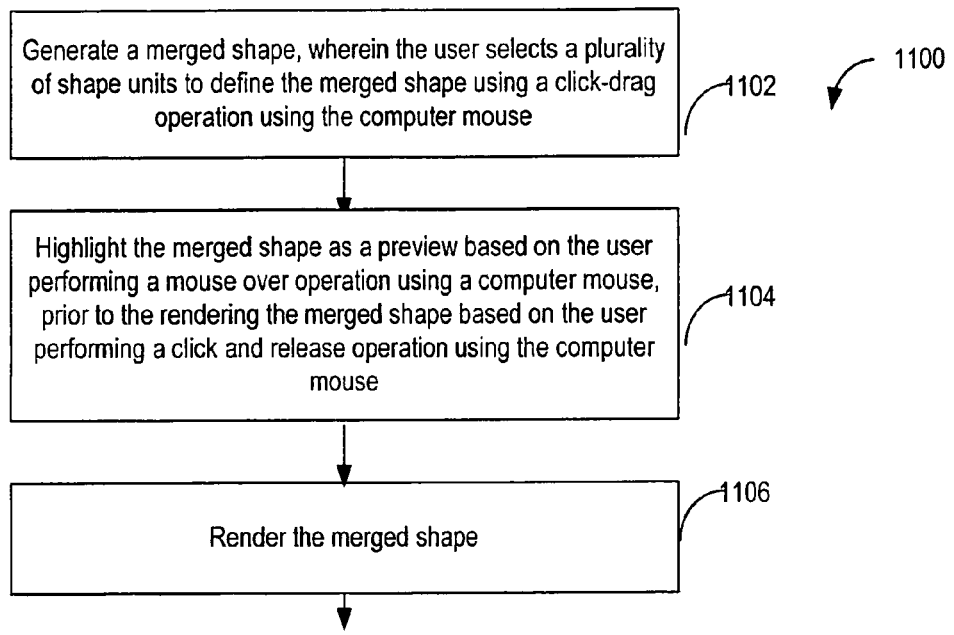
FIG. 11 is a flow diagram for a sequence of edits using a merge shape tool of a computer graphics software application executing on a computer to generate a merged shape based on a selected plurality of shape units in accordance with one embodiment.

FIG. 11 is a flow diagram 1100 for a sequence of edits using a merge shape tool of a computer graphics software application executing on a computer to generate a merged shape based on a selected plurality of shape units in accordance with one embodiment. At stage 1102, generate a merged shape, wherein a plurality of shape units are selected to define the merged shape using a click-drag operation using the computer mouse. At stage 1104, highlight the merged shape as a preview based on a mouse over operation using the computer mouse, prior to rendering the merged shape based on a click and release operation using the computer mouse. At stage 1106, render the merged shape.

Figure 12:
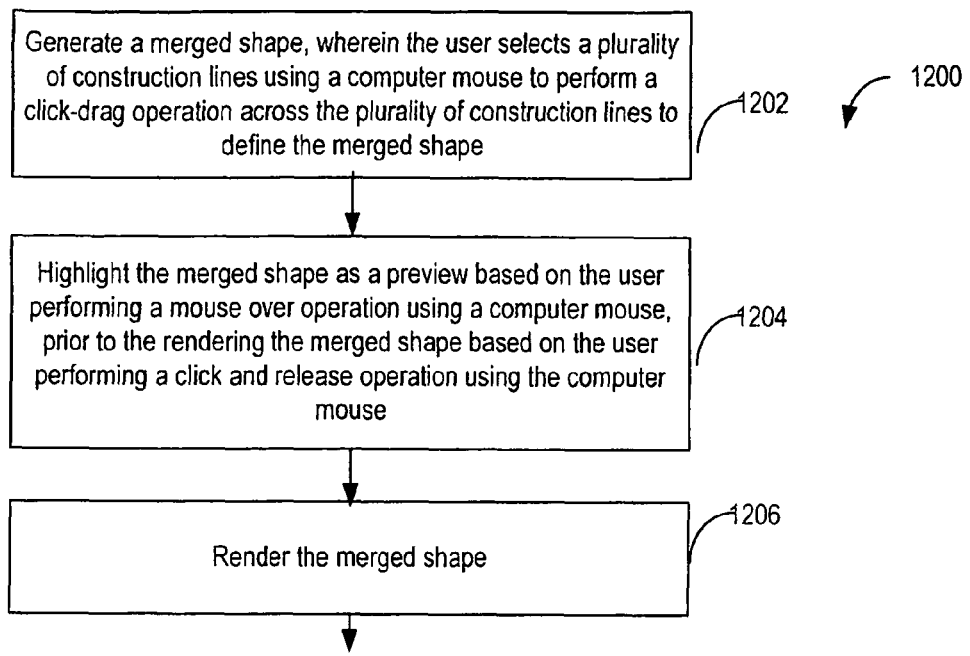
FIG. 12 is a flow diagram for a sequence of edits using a merge shape tool of a computer graphics software application executing on a computer in accordance with one embodiment.

FIG. 12 is a flow diagram 1200 for a sequence of edits using a merge shape tool of a computer graphics software application executing on a computer in accordance with one embodiment. At stage 1202, generate a merged shape, wherein a plurality of construction lines are selected using a computer mouse to perform a click-drag operation across the plurality of construction lines to define the merged shape. At stage 1204, highlight the merged shape as a preview based on a mouse over operation using the computer mouse, prior to rendering the merged shape based on a click and release operation using the computer mouse. At stage 1206, render the merged shape.

Figure 13:
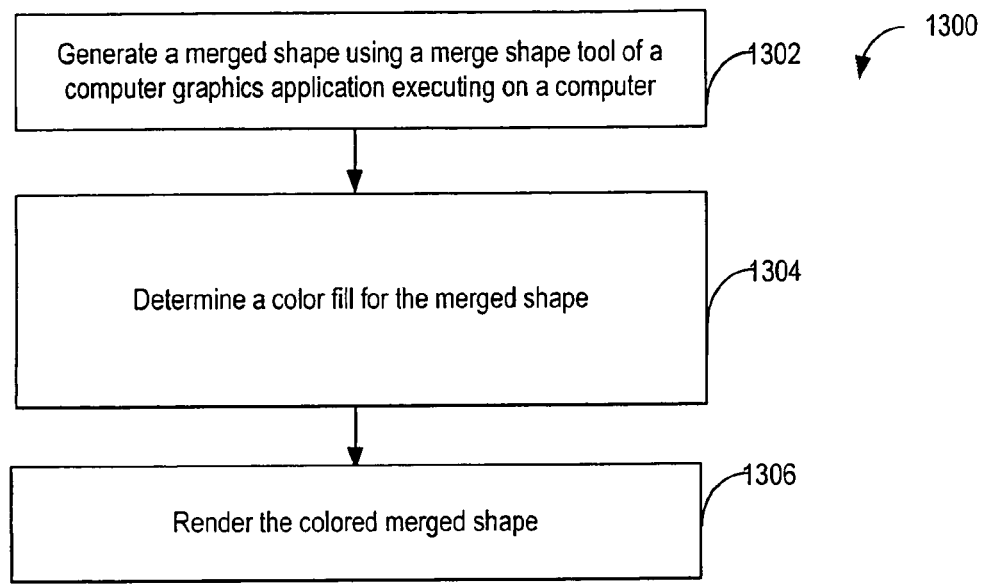
FIG. 13 is a flow diagram for a sequence of edits using a merge shape tool of a computer graphics software application executing on a computer to generate a colored merged shape in accordance with one embodiment.

FIG. 13 is a flow diagram 1300 for a sequence of edits using a merge shape tool of a computer graphics software application executing on a computer to generate a colored merged shape in accordance with one embodiment. At stage 1302, generate a merged shape using a merge shape tool of a computer graphics application executing on a computer. At stage 1304, determine a color fill for the merged shape. As similarly described above, in one embodiment, a color fill is determined based on a selected shape unit at the start of a merge operation, and in another embodiment (e.g., a first selected shape unit for the merge operation), a color fill is determined based on a selected shape unit at the end of a merge operation (e.g., a final selected shape unit for the merge operation). At stage 1306, render the colored merged shape.

Figure 14:
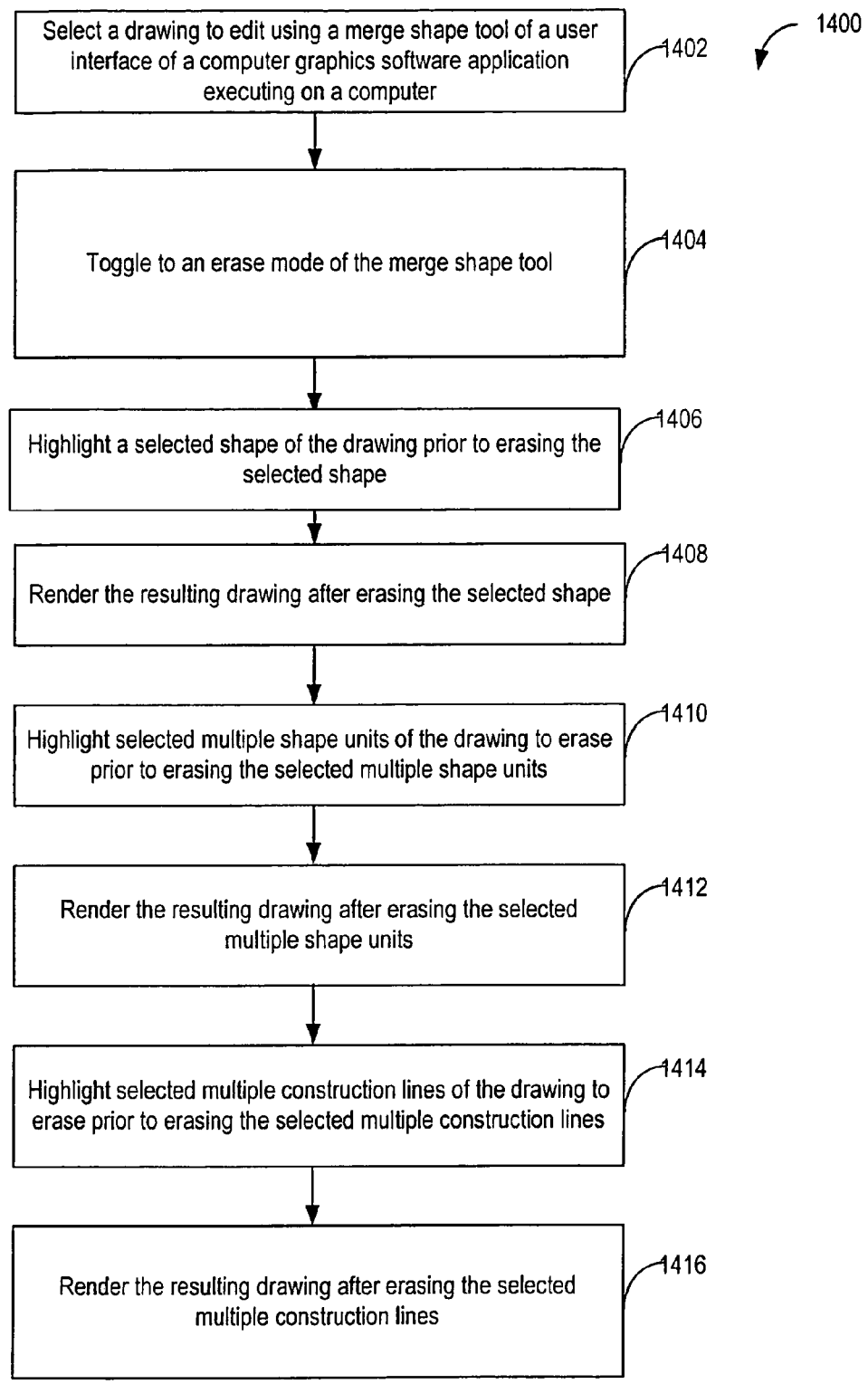
FIG. 14 is a flow diagram for a sequence of edits using an erase mode of a merge shape tool of a computer graphics software application executing on a computer in accordance with one embodiment.

FIG. 14 is a flow diagram 1400 for a sequence of edits using an erase mode of a merge shape tool of a computer graphics software application executing on a computer in accordance with one embodiment. At stage 1402, select a drawing to edit using a merge shape tool of a user interface of a computer graphics software application executing on a computer. At stage 1404, toggle to an erase mode of the merge shape tool. At stage 1406, highlight a selected shape of the drawing prior to erasing the selected shape. At stage 1408, render the resulting drawing after erasing the selected shape. At stage 1410, highlight selected multiple shape units of the drawing prior to erasing the selected multiple shape units. At stage 1412, render the resulting drawing after erasing the selected multiple shape units. At stage 1414, highlight selected multiple construction lines of the drawing prior to erasing the selected multiple construction lines. At stage 1416, render the resulting drawing after erasing the selected multiple construction lines.

FIG. 15 is a series of drawings illustrating a sequence of edits involving irregular/freeform shape regions using a merge shape tool of a computer graphics software application executing on a computer in accordance with one embodiment. As shown in FIG. 15A, a drawing 1500 includes intersecting irregular shape regions. A drawing 1500 is selected to edit, and a merge shape tool is also selected to edit drawing 1500. As shown, a click-drag operation is initiated in shape unit 1505 and continued through shape units 1510 and 1515. Upon completion of the click-drag operation (e.g., upon the user releasing the mouse button during the click-drag operation at shape unit 1515), the resultant, new merged shape 1520 is rendered as shown.

Referring now to FIG. 15B, a drawing 1550 includes intersecting freeform shape regions. A drawing 1550 is selected to edit, and a merge shape tool is also selected to edit drawing 1550. As shown, a click-drag operation is initiated in shape unit 1555 and continued through shape units 1560, 1565, 1570, and 1575. Upon completion of the click-drag operation (e.g., upon the user releasing the mouse button during the click-drag operation at shape unit 1575), the resultant, new merged shape 1580 is rendered as shown.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method, comprising:
receiving, at a computing device, input for a click-drag operation indicating selection of a plurality of shape units formed by intersecting shape regions, the intersecting shape regions including at least a first shape region and a second shape region that intersect each other;
in response to determining that the click-drag operation has completed, generating a first merged shape using a computer processor of the computing device by merging at least the first shape region and the second shape region, based on the click-drag operation defining:
an open path across the plurality of shape units; and
the first merged shape formed by intersecting shape regions intersected by the open path; and
rendering the first merged shape on the display device using the computer processor.

2. The method of claim 1, wherein the intersecting shape regions include one or more regular, irregular, or freeform shape regions, the method further comprising, prior to the rendering:
highlighting the selected plurality of shape units on the display device; and
highlighting the first merged shape as a preview on the display device based on receiving a mouse over operation input and a click and release operation input.

3. The method of claim 1, wherein a first closed shape intersected by a second closed shape defines a first shape unit.

4. The method of claim 1, wherein a first non-closed shape intersected by a second non-closed shape defines a first shape unit.

5. The method of claim 1, wherein a closed shape intersected by a non-closed shape defines a first shape unit.

6. The method of claim 1, further comprising:
receiving, at the computing device, input for another click-drag operation indicating selection of one or more shape units and one or more open regions; and
generating a second merged shape using the computer processor, based on the another click-drag operation across the one or more shape units and the one or more open regions input defining the second merged shape; and
rendering the second merged shape on the display device using the computer processor.

7. The method of claim 1, further comprising:
receiving, at the computing device, input indicating another click-drag operation selecting a plurality of construction lines; and
generating a second merged shape using the computer processor, based on the another click-drag operation defining:
another open path across the plurality of construction lines; and
the second merged shape; and
rendering the second merged shape on the display device using the computer processor.

8. The method of claim 1, further comprising:
determining a color fill for the first merged shape based on a color fill input; and
rendering the first merged shape with the color fill on the display device.

9. The method of claim 1, further comprising:
receiving, at the computing device, a color fill input including another click-drag operation indicating selection of the plurality of shape units; and
generating a colored merged shape based on the color fill input using the computer processor, based on the another click-drag operation across the plurality of shape units defining the colored merged shape; and
rendering the colored merged shape on the display device using the computer processor.

10. The method of claim 1, further comprising:
toggling to an erase shape mode of a merge shape tool;
determining a shape unit to erase using an erase shape tool; and
highlighting the shape unit as a preview on the display device based on receiving a mouse over operation input prior to rendering a modified shape resulting from erasing the shape unit based on a click and release operation input,
wherein a portion of an input device for the merge shape tool is mapped to a drawing edge of a graphical user interface of a computer graphics program executing on the computing device, and another portion of the input device for the erase shape tool is mapped to an erasing edge of the graphical user interface of the computer graphics program.

11. The method of claim 1, further comprising:
toggling to an erase shape mode of a merge shape tool;
determining a plurality of shape units to erase using an erase shape tool; and
highlighting the determined plurality of shape units as a preview on the display device based on receiving a mouse over operation input prior to rendering a modified shape resulting from erasing the determined plurality of shape units based on a click and release operation input.

12. The method of claim 1, further comprising:
determining a plurality of shape units to erase using an erase shape tool, wherein the erase shape tool highlights the plurality of shape units;
erasing the plurality of shape units based on receiving an input indicating that the selected plurality of shape units are to be erased;
rendering, on the display device, a modified shape resulting from the erasing the plurality of shape units; and
storing the modified shape is stored in a memory of the computing device.

13. The method of claim 1, further comprising:
toggling to an erase shape mode of a merge shape tool;
determining a plurality of construction lines to erase using an erase shape tool, wherein the erase shape tool highlights the plurality of construction lines;
erasing the plurality of construction lines based on receiving an input indicating that the plurality of construction lines are to be erased; and
rendering the resulting shape on the display device.

14. A system, comprising:
a processor;
a display device; and
a memory having instructions stored thereon, which when executed by the processor, cause the processor to:
receive input for a click-drag operation indicating selection of a plurality of shape units formed by at least a first shape region and a second shape region that intersect each other;
upon completion of the click-drag operation, generate a first merged shape by merging at least the first shape region and the second shape region, based on the click-drag operation defining:
an open path across the plurality of shape units; and
the first merged shape formed by only the first shape region and the second shape region that intersect each other and are also intersected by the open path; and
render the first merged shape on the display device.

15. The system recited in claim 14, wherein the plurality of shape units are formed by intersecting shape regions including one or more regular, irregular, or freeform shape regions, the memory having further instructions stored thereon, which when by the processor, executed cause the processor to:
highlight the selected plurality of shape units on the display device; and
highlight the first merged shape as a preview on the display device based on receiving a mouse over operation input and a click and release operation input prior to rendering the first merged shape.

16. The system recited in claim 14, the memory having further instructions stored thereon, which when by the processor, executed cause the processor to:
receive input for another click-drag operation indicating selection of a plurality of construction lines;
generate a second merged shape based on the another click-drag operation defining:
a path across the plurality of construction lines; and
the second merged shape; and
render the second merged shape on the display device.

17. The system recited in claim 14, the memory having further instructions stored thereon, which when by the processor, executed cause the processor to:
generate a colored merged shape based on a received color input indicating selection of the plurality of shape units based on the click-drag operation across the plurality of shape units input defining the colored merged shape; and
render the colored merged shape on the display device.

18. The system recited in claim 14, the memory having further instructions stored thereon, which when by the processor, executed cause the processor to:
toggle to an erase shape mode of a merge shape tool;
determine a plurality of shape units to erase using an erase shape tool; and
highlight the determined plurality of shape units as a preview on the display device based on receiving a mouse over operation input prior to rendering a modified shape resulting from erasure of the determined plurality of shape units based on a click and release operation input.

19. The system recited in claim 14, the memory having further instructions stored thereon, which when by the processor, executed cause the processor to:
toggle to an erase shape mode of a merge shape tool;
determine a plurality of construction lines to erase using an erase shape tool, wherein the erase shape tool highlights the plurality of construction lines on the display device;
erase the plurality of construction lines based on receiving an input indicating that the plurality of construction lines are to be erased; and
render the resulting shape on the display device.

20. A non-transitory computer readable storage medium having computer executable instructions stored thereon that, if executed by a computer, cause the computer to perform operations comprising:
receiving, at the computer, input for a click-drag operation indicating selection of a plurality of shape units formed by at least a first shape region and a second shape region that intersect each other;
in response to determining that the click-drag operation has completed, generating a first merged shape by merging at least the first shape region and the second shape region, based on the click-drag operation defining:
an open path across the plurality of shape units; and
the first merged shape formed by intersecting shape regions intersected by the open path; and
rendering the first merged shape on a display device.

21. The computer program product recited in claim 20, wherein the intersecting shape regions include one or more regular, irregular, or freeform shape regions, the operations further comprising:
highlighting the selected plurality of shape units on the display device;
highlighting the first merged shape as a preview on the display device based on receiving a mouse over operation input and a click and release operation input prior to the rendering of the first merged shape.

22. The computer program product recited in claim 20, the operations further comprising:
receiving input for another click-drag operation indicating selection of a plurality of construction lines;
generating a second merged shape based on the another click-drag operation defining:
a path across the plurality of construction lines; and
the second merged shape; and
rendering the second merged shape on the display device.

23. The computer program product recited in claim 20, the operations further comprising:
generating a colored merged shape based on a color input, wherein a plurality of shape units are selected based on a click-drag operation across the plurality of shape units input to define the colored merged shape; and rendering the colored merged shape on the display device.

24. The computer program product recited in claim 20, the operations further comprising:

toggling to an erase shape mode of a merge shape tool; and determining a plurality of shape units to erase using an erase shape tool; and highlighting the determined plurality of shape units as a preview on the display device based on receiving a mouse over operation input, prior to rendering a resulting shape based on a click and release operation input.

25. A method, comprising:

receiving, at a graphical user interface of a graphics program executing on a computing platform, a first input indicating initiation of a single, continuous click-drag operation selecting a plurality of shape units formed by intersecting shape regions, the intersecting shape regions including at least a first shape region and a second shape region that intersect each other;

executing instructions on the computing platform so that upon receiving a second input indicating completion of the click-drag operation, a first merged shape is generated by merging at least the first shape region and the second shape region, based on the click-drag operation defining:

an open path across the plurality of shape units, wherein the open path did not exist prior to the click-drag operation; and the first merged shape formed by intersecting shape regions intersected by the open path; and executing instructions on the computing platform so that the first merged shape is rendered in the graphical user interface.

26. The method of claim 25, wherein:

the first and second inputs are received via an input device interacting with the graphical user interface;

the first input comprises one or more of a first input at the graphical user interface, a click of a button of the input device, and a click of a button of the computing platform;

the second input comprises one or more of a second input at the graphical user interface, a release of the button of the input device, and a release of the button of the computing platform; and the click-drag operation comprises movement of the input device along the open path between a portion of the graphical user interface where the first input is received and another portion of the graphical user interface where the second input is received.

* * * * *